US009588605B2

(12) United States Patent
Lye

(10) Patent No.: US 9,588,605 B2
(45) Date of Patent: Mar. 7, 2017

(54) TRACKING METHOD AND OPTICAL INPUT DEVICE USING THE SAME

(71) Applicant: PIXART IMAGING INC., Hsin-Chu (TW)

(72) Inventor: Keng Yeen Lye, Penang (MY)

(73) Assignee: PIXART IMAGING INC., Hsin-Chu (TW)

( * ) Notice: Subject to any disclaimer, the term of this patent is extended or adjusted under 35 U.S.C. 154(b) by 246 days.

(21) Appl. No.: 14/205,352

(22) Filed: Mar. 11, 2014

(65) Prior Publication Data

US 2015/0261322 A1    Sep. 17, 2015

(51) Int. Cl.
G06F 3/038     (2013.01)
G06F 3/03      (2006.01)
G06F 3/0354    (2013.01)

(52) U.S. Cl.
CPC .......... *G06F 3/0383* (2013.01); *G06F 3/0317* (2013.01); *G06F 3/03543* (2013.01)

(58) Field of Classification Search
CPC ............................ G06F 3/0383; G06F 3/03543
See application file for complete search history.

(56) References Cited

U.S. PATENT DOCUMENTS

| | | | |
|---|---|---|---|
| 6,363,160 B1 * | 3/2002 | Bradski | G06K 9/00 382/103 |
| 7,633,489 B2 | 12/2009 | Lee et al. | |
| 7,839,387 B2 | 11/2010 | Afriat et al. | |
| 8,405,613 B2 | 3/2013 | Bieber et al. | |
| 2003/0058218 A1 * | 3/2003 | Crane | G06F 3/0317 345/158 |
| 2004/0095323 A1 * | 5/2004 | Ahn | G06F 3/0317 345/166 |
| 2005/0162393 A1 * | 7/2005 | Ahn | G06F 3/0317 345/166 |

(Continued)

FOREIGN PATENT DOCUMENTS

TW    I361990 B    4/2012
TW    I421737 B    1/2014

OTHER PUBLICATIONS

Taiwan Patent Office, Office action issued on Oct. 29, 2015.

*Primary Examiner* — Claire X Pappas
*Assistant Examiner* — Robert Stone
(74) *Attorney, Agent, or Firm* — Li & Cai Intellectual Property (USA) Office

(57) ABSTRACT

A tracking method of an optical input device includes: capturing a first image as a reference frame and an input image subsequent to the first image as a compare frame while the optical input device operates; computing correlation between the compare frame and the reference frame for a first correlation window to obtain a first peak correlation value; computing another correlation between the compare frame and the reference frame for a second correlation window when the first peak correlation value identified is located at a corner of the first correlation window; when a second peak correlation value of the second correlation window is determined to be greater than the first peak correlation value, computes a displacement information of the optical input device based on the pixel position associated with the second peak correlation value identified in the compare frame.

19 Claims, 4 Drawing Sheets

(56) References Cited

U.S. PATENT DOCUMENTS

| | | | |
|---|---|---|---|
| 2006/0022116 A1* | 2/2006 | Wang | G06F 3/0317 |
| | | | 250/208.1 |
| 2006/0062306 A1 | 3/2006 | Ha et al. | |
| 2007/0150194 A1* | 6/2007 | Chirikov | G06F 3/0317 |
| | | | 701/500 |
| 2011/0038508 A1* | 2/2011 | Teoh | G06F 1/3203 |
| | | | 382/103 |
| 2011/0150363 A1* | 6/2011 | Chen | G06F 3/0304 |
| | | | 382/291 |
| 2013/0301880 A1* | 11/2013 | Chen | G06T 7/0044 |
| | | | 382/103 |

* cited by examiner

TRACKING METHOD AND OPTICAL INPUT DEVICE USING THE SAME

BACKGROUND

1. Technical Field

The present disclosure relates to an optical input device, in particular, to a tracking method of an optical input device and an optical input device using the same.

2. Description of Related Art

Correlation technique has been commonly used by optical input devices such as optical mice for aligning similar features between successive images captured i.e., a reference image and an input image (e.g., a compare image) captured subsequent to the reference image, so as to determine the relative motion (e.g., relative displacement and relative velocity) of the optical input device with respect to a work surface. The relative displacement and velocity tracked can be used for controlling the movement of a cursor on a display.

One of the conventional correlation techniques is to correlate the reference image and the compare image on a pixel by pixel basis using a two-dimensional cross-correlation. Even though the pixel by pixel correlation scheme in practice could yield accurate result but could be time consuming as it requires intensive computations. The optical input device generally is subject to specific technical constraints, particularly time and power constraints. Further, the related image processing must be performed within a very short period so that the movement of the optical input device can be indicated on the display in a manner which appears instantaneous to the user. Moreover, since optical input device is generally battery-powered, thus the longer the image processing time, the more power will be consumed.

Another conventional correlation technique is known as the block correlation scheme which computes correlation between the reference image and the compare image for a predefined correlation window, and obtains the peak correlation value. The block correlation scheme is more computationally efficient in comparison to the pixel by pixel correlation scheme. However, the peak found using the block correlation scheme sometimes may not be the real peak. That is, the peak found using the using block correlation scheme may only be the peak within the predefined correlation window, but not the actual peak between the reference frame and the compare frame. In other words, the block correlation scheme may be efficient in tracking the movement of the optical input device but there is still room for improving the tracking accuracy.

SUMMARY

Accordingly, the present disclosure provides a tracking method and an optical input device using the same. The tracking method can efficiently and accurately identify the peak correlation value between frames captured and determine the motion of an optical input device while the optical input device operates. Thereby, increases the tracking performance of the optical input device.

An exemplary embodiment of the present disclosure provides tracking method, which is adapted for tracking a movement of an optical input device. The tracking method includes the following steps. While the optical input device operates, sequentially captures a plurality of images to generate a plurality of frames. A first frame is set as a reference frame and an input frame subsequent to the first frame is set as a compare frame. Correlation between the compare frame and the reference frame for a first correlation window is computed to obtain a first peak correlation value. Another correlation between the compare frame and the reference frame for a second correlation window is computed when the first peak correlation value obtained is determined to be located at a corner of the first correlation window to determine whether the first peak correlation value is the maximum correlation value between the compare frame and the reference frame. The second correlation window is a predetermined region of the compare frame centering on the position of the first peak correlation value.

An exemplary embodiment of the present disclosure provides an optical input device. The optical input device includes a light source, an image capturing unit, and a processing unit. The light source is configured for operatively illuminating a work surface of the optical input device. The image capturing unit is configured to operatively capture a plurality of images responsive to a reflected light of the work surface and generate a plurality of frames according to a frame rate. The processing unit is coupled to the light source and the image capturing unit. The processing unit is configured for operatively analyzing a movement of the optical input device based on the frames captured. The processing unit is further configured to operatively execute the aforementioned tracking method According to one exemplary embodiment of the present disclosure, the tracking method further includes when determines that the second peak correlation value of the second correlation window computed is greater than the first peak correlation value, computes a displacement information of the optical input device based on the pixel position associated with a second peak correlation value identified in the compare frame.

According to one exemplary embodiment of the present disclosure, the tracking method further includes when determines that the second peak correlation value computed is less than the first peak correlation value, computes the displacement information of the optical input device based on the pixel position associated with the first peak correlation value identified in the compare frame.

An exemplary embodiment of the present disclosure provides a non-transitory computer-readable media, for storing a computer executable program for the aforementioned tracking method. When the non-transitory computer readable recording medium is read by a processor, the processor executes the aforementioned tracking method.

To sum up, exemplary embodiments of the present disclosure provide a tracking method and an optical input device using the same, in which when a peak correlation value computed is found at the corner of a predetermined correlation window in a process of comparing frames captured, another correlation between frames centering on the position of the peak correlation value is automatically computed for verifying whether the peak correlation value is the actual peak or there is another peak exist outside the predetermined correlation window, so as to increase the accuracy of tracking the relative movement of the optical input device can be quick and efficiently achieved.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
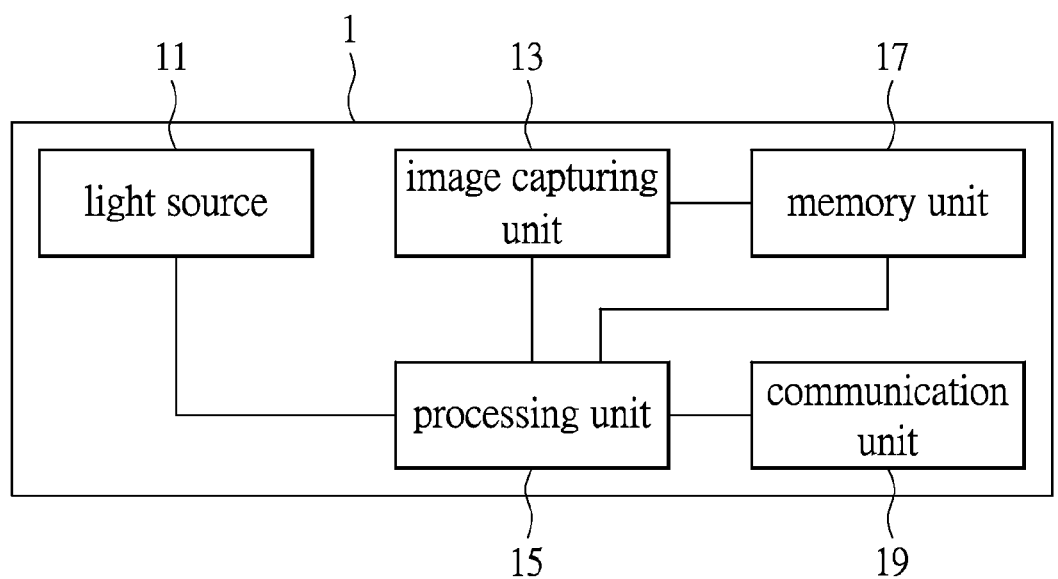
FIG. 1 is a block diagram illustrating an optical input device provided in accordance to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

The objective of the present disclosure is to provide a tracking method, which can efficiently and accurately compute the displacement of an optical input device, such as an optical mouse, a joystick, and the like, through actively verifying the validity of the peak correlation value obtained from correlations between successive frames captured. Such that the optical input device is operable for precisely controlling the operation of a cursor on a display.

Information regarding the hardware architecture of the optical input device, the basic operations of the optical input device including capturing image, image processing, displacement computation, cursor control operation, are commonly known to those skilled in the art. Hence detailed explanations are omitted herein, and only the related information concerning the present disclosure will be provided in the present disclosure.

Please refer to FIG. 1, which shows a block diagram illustrating an optical input device provided in accordance to an exemplary embodiment of the present disclosure. The optical input device 1 includes but not limited to a wireless optical mouse, a wireless track pad, or a wireless joystick.

The optical input device 1 in the instant embodiment is equipped with a battery for providing the necessary operational power, wherein the battery may be a dry cell battery. In another embodiment, the optical input device may acquire operational power from a host computing device (e.g., a personnel computer or a laptop) through cable connection such as USB connection.

Briefly, the optical input device 1 operatively captures frames of a work surface and determines the relative displacement of the optical input device 1 as the optical input device 1 being move across the work surface through sequentially comparing frames captured. The optical input device 1 further wirelessly transmits the displacement information computed to a computing device (not shown) such as a host computer, a laptop for use by the computing device in controlling the operation of a cursor or other indicator displayed on a display screen of the computing device.

The optical input device 1 includes a light source 11, an image capturing unit 13, a processing unit 15, a memory unit 17, and a communication unit 19. The light source 11, the image capturing unit 13, the memory unit 17, and the communication unit 19 are coupled to the processing unit 15, respectively. The processing unit 15 operatively controls the operations of the light source 11, the image capturing unit 13, the memory unit 17, and the communication unit 19.

More specifically, the light source 11 of the optical input device 1 operatively illuminates the work surface (e.g., a mouse pad or a desktop) and a reflected light is then generated from the work surface. The light source 11 can be implemented by a light-emitting diode or a laser diode and the present disclosure is not limited thereto. Particularly, in one implementation, the light source 11 can comprise of an array of light emitting diodes. However, in practice, the light source 11 may comprise of one or more light emitting diodes depends upon actual operational requirement, and the present disclosure is not limited thereto.

The image capturing unit 13 is configured for capturing a plurality of images responsive to the reflected light of the work surface and sequentially generating a plurality of frames according to a frame rate. In the instant embodiment, the frame rate may be configured according to the operational requirement (such as tracking operation) of the optical input device 1. Specifically, the frame rate of the optical input device 1 may be configured according to the moving speed of the optical input device 1. In the instant embodiment, the frame rate may be configured to range from 500 frames per sec (fps)~1000 fps depend upon the operational requirement (e.g., power limitation, tracking speed, tracking accuracy, and the like) of the optical input device 1. The frame rate can be predefined and stored in the memory unit 17.

The image capturing unit 13 may be implemented by a charge-coupled device (CCD) image sensor or a complementary metal oxide semiconductor (CMOS) sensor. Those skilled in the art should be able to design according to practical application requirement and the instant embodiment is not limited thereto.

The processing unit 15 is the operation core of the optical input device 1. Specifically, the processing unit 15 is configured for analyzing a movement of the optical input device 1 based on the frames captured by the image capturing unit 13. The processing unit 15 computes the relative displacement and the velocity (i.e., the relative moving speed and the direction) of the optical input device 1 as the optical input device 1 being moved across the work surface by computing correlation between consecutive frames.

The processing unit 15 further generates the displacement information based on the computation result and controls the communication unit 19 to wirelessly transmit the displacement information to the computing device and correspondingly controls the movement of the cursor displayed thereon.

The processing unit 15 operatively controls the image capturing unit 13 to sequentially capture a plurality of images according to the frame rate and generate a plurality of frames while the optical input device 1 operates.

It worth to mention that the DCR filter can be utilized to remove the detected digital contours in any raw image (e.g., the input image) captured by the image capturing unit 13 to smooth the image and filter out unwanted noise for ensuring the noise generated by the image sensor would not affect the analyzation of the image. The operation and the implementation of the DCR filter are known to those skilled in the art, hence further description are hereby omitted.

More specifically, the processing unit 15 operatively controls the image capturing unit 13 to capture and store a first image as a reference frame IMG_REF and an input image captured subsequent to the first image as a compare frame IMG_CMP. In one configuration, the processing unit 15 can control the image capturing unit 13 to store the pixelated data of reference frame IMG_REF in a first memory bank of the memory unit 17 and the pixelated data of the compare frame IMG_CMP in a second memory bank of the memory unit 17.

The processing unit 15 computes correlation between the compare frame IMG_CMP and the reference frame IMG_REF for a first correlation window to obtain a first peak correlation value. The first peak correlation value can be used to identify a feature e.g., a light pattern from the compare frame IMG_CMP to determine the relative displacement of the optical input device 1. The first correlation window can be a 5×5 correlation window or 7×7 correlation window depend upon operational requirements such as tracking speed.

Particularly, the processing unit 15 can compute the correlation between the compare frame IMG_CMP and the reference frame IMG_REF by fixing the reference frame IMG_REF in position while repeatedly shifting the compare frame IMG_CMP according to an index movement, wherein the index movement corresponds to the size of the first correlation window configured. The processing unit 15 further computes correlations between pixel values of the reference frame IMG_REF and the respective pixel values of the compare frame IMG_CMP within the first correlation window.

To put it concretely, taking the correlation value at the center of the first correlation window as an example, the processing unit 15 can compute the correlation value at the center by first overlapping the compare frame IMG_CMP on the reference frame IMG_REF. The processing unit 15 then multiplies each compare pixel value of the compare frame IMG_CMP by the respective reference pixel value in the reference frame IMG_REF, and sums the multiplication results to generate the correlation value for the center of the first correlation window. The rest of correlation values in the first correlation window are computed by appropriately shifting the compare frame IMG_CMP and computes correlation between the pixel values of the compare frame IMG_CMP and the reference frame IMG_REF.

It is worth to mention that image correlation techniques relate to computing correlation between frames captured for computing displacement of the optical input device 1 are known techniques hence further descriptions are hereby omitted.

Next, the processing unit 15 operatively analyzes the first correlation window and identifies the first peak correlation value thereof based on a predetermined criterion e.g., greater than a correlation threshold. In one embodiment, the processing unit 15 may compare correlation values of the first correlation window with the correlation threshold to identify the first peak correlation value. In another embodiment, the processing unit 15 may just compare correlation values in the first correlation window to identify the maximum correlation value as the first peak correlation value.

Different from the conventional block correlation scheme, after obtaining the first peak correlation value, the processing unit 15 further verifies whether the first peak correlation value is the real peak correlation value between the reference frame IMG_REF and the compare frame IMG_CMP. More specifically, the processing unit 15 determines whether or not the position associated with the first peak correlation value is located at the corner of the first correlation window.

When the processing unit 15 determines that the position associated with the first peak correlation value is not at the corner of the first correlation window, i.e., located at a non-corner positions in the first correlation window, the processing unit 15 directly computes a displacement information of the optical input device 1 based on the pixel position associated with the first peak correlation value identified in the compare frame IMG_CMP.

When the processing unit 15 determines that the position associated with the first peak correlation value is located at the corner of the first correlation window, the processing unit 15 operatively computes another correlation to verify whether first peak correlation value is the maximum correlation value between the reference frame IMG_REF and the compare frame IMG_CMP or there is another peak outside the first correlation window.

Specifically, the processing unit 15 computes the correlation between the reference frame IMG_REF and the compare frame IMG_CMP for a second correlation window. The second correlation window is defined as a predetermined region of the compare frame IMG_CMP centering on the pixel position associated with the first peak correlation value identified in the compare frame IMG_CMP. The second correlation window is at least a 3×3 correlation window, wherein the size of second correlation window may depend upon the tracking operation of the optical input device 1, such as the frame rate or the location of the peak correlation value identified previously. The processing unit 15 subsequently analyzes the second correlation window to obtain a second peak correlation value.

As with the first peak correlation value, the second peak correlation value can be obtained based on a predetermined criterion (e.g., the correlation threshold) or is the maximum correlation value in the second correlation window.

The processing unit 15 operatively compares the first peak correlation value with the second peak correlation value. When the processing unit 15 determines that the first peak correlation value is greater than the second peak correlation value indicating that the first peak correlation value is the real peak correlation value between the reference frame IMG_REF and the compare frame IMG_CMP, the processing unit 15 computes the displacement information based on the pixel position associated with the first peak correlation value identified in the compare frame IMG_CMP.

Conversely, when the processing unit 15 determines that the first peak correlation value is less than the second peak correlation value, indicating that the second peak correlation value is the real peak correlation value instead of the first peak correlation value between the reference frame IMG_REF and the compare frame IMG_CMP, the processing unit 15 computes the displacement information based on the pixel position associated with the second peak correlation value identified in the compare frame IMG_CMP.

The processing unit 15 transmits the displacement information (i.e., the displacement information computed with the position of the first or the second peak correlation value in the compare frame IMG_CMP) to the computing device and controls the operation of the cursor displayed on the display screen of the computing device.

The processing unit 15 further updates the reference frame IMG_REF with the current compare frame IMG_CMP and continue correlating the reference frame IMG_REF and the compare frame IMG_CMP to compute the displacement information until the optical input device 1 stops operating.

Incidentally, whenever the image capturing unit 13 captures any input image as the compare frame, the processing unit 15 determines whether to update the reference frame with the previously inputted compare frame. When the processing unit 15 determines need to update the reference frame, the processing unit 15 configures the current compare frame in the memory unit 17 as the reference frame and update the reference frame in the memory unit 17 with the newly captured input image.

It is worth to note that the processing unit 15 may be implemented by a processing chip programmed with the tracking method described and disposed inside the optical input device 1. The processing chip can include but not limited to a microcontroller, or an embedded controller, however the present disclosure is not limited to the example provided herein. The memory unit 17 can be implemented by a volatile or a non-volatile memory such as a flash memory, a read only memory, or a random access memory, and the present disclosure is not limited to the example provided herein.

The communication unit 19 is a wireless transmission interface e.g., a Bluetooth interface, or a Wi-Fi interface. The exact type, exact structure, and/or implementation method associated with the communication unit 19 can be configured according to the type and actual structure of computing device and the optical input device 1, and the present disclosure is not limited thereto.

It should be noted that the internal structure of the optical input device 1 may vary according to specific design structure and/or operational requirement of the optical input device 1. In other words, FIG. 1 is merely used for illustrating the tracking operation of the optical input device 1 and the present disclosure is not limited thereto.

Figure 2:
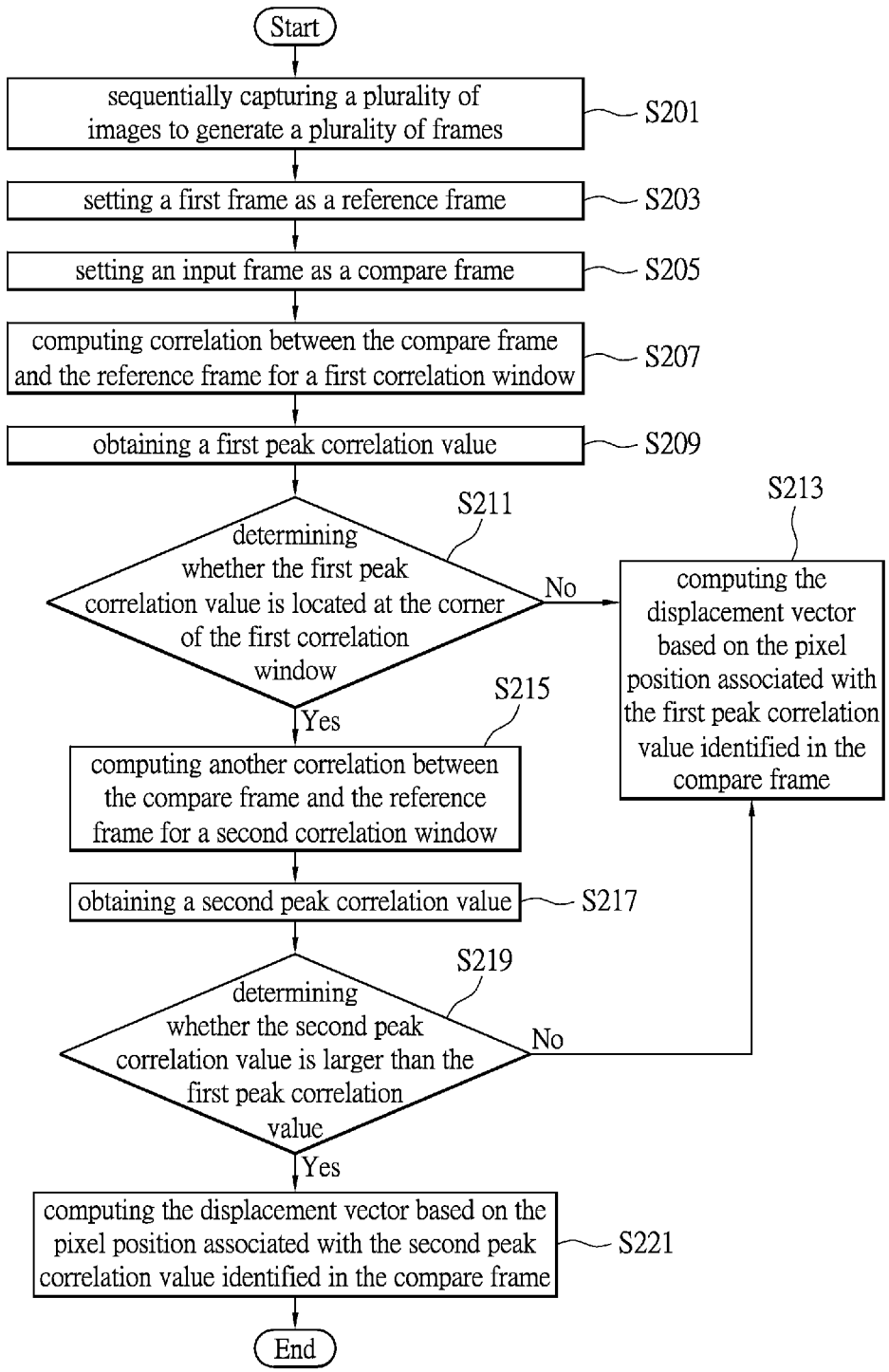
FIG. 2 is a flowchart illustrating a tracking method provided in accordance to an exemplary embodiment of the present disclosure.
Figure 3A:
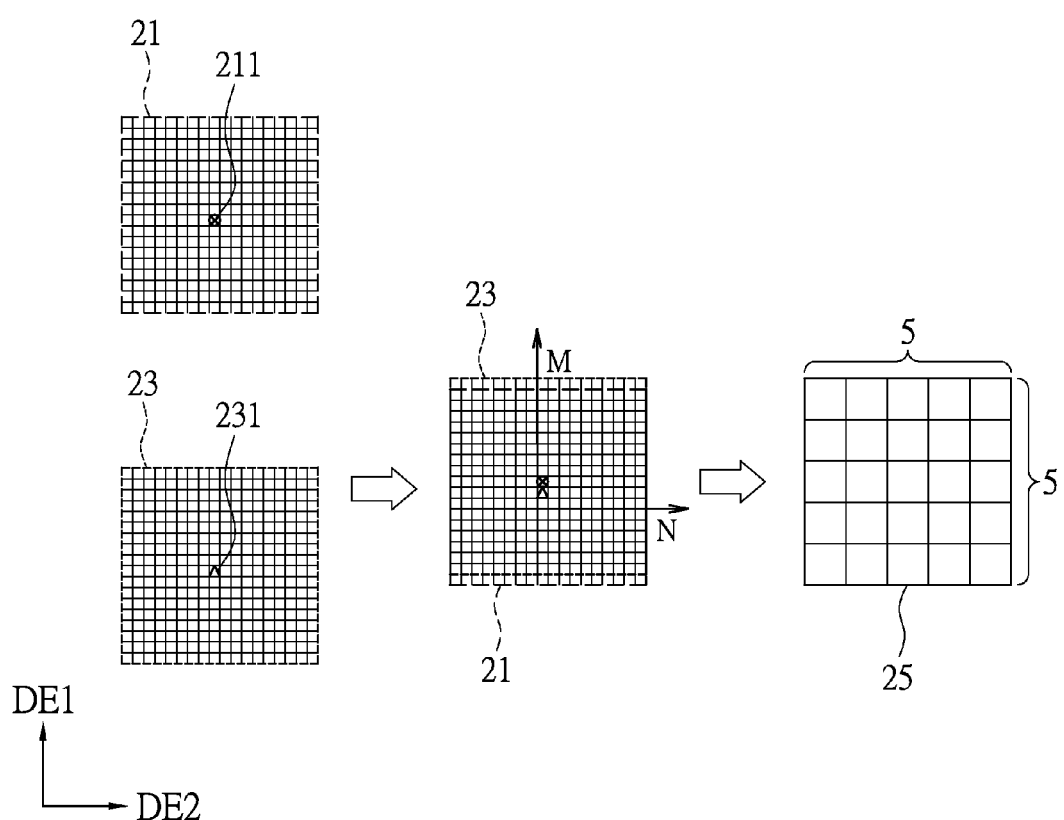
FIG. 3A is a schematic view of computing a correlation between the reference frame and the compare frame for a first correlation window provided in accordance to an exemplary embodiment of the present disclosure.
Figure 3B:
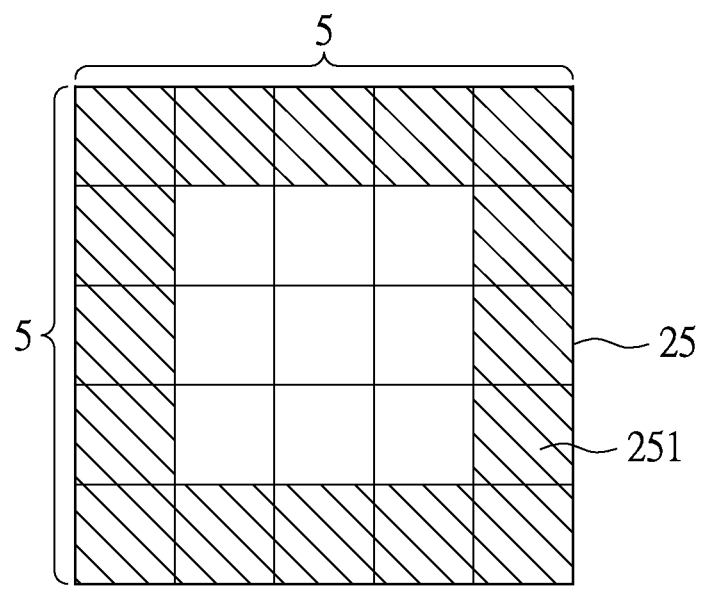
FIG. 3B is a schematic view of a first correlation window computed provided in accordance to an exemplary embodiment of the present disclosure.

For further understanding over the present disclosure, a tracking method for the aforementioned optical input can be generalized from the aforementioned exemplary embodiment. Please refer to FIG. 2 in conjunction with FIG. 1, FIG. 3A, and FIG. 3B. FIG. 2 shows a flowchart diagram illustrating a tracking method provided in accordance to an exemplary embodiment of the present disclosure. FIG. 3A shows a schematic view of computing a correlation between the reference frame and the compare frame for a first correlation window provided in accordance to an exemplary embodiment of the present disclosure. FIG. 3B shows a schematic view of a first correlation window computed provided in accordance to an exemplary embodiment of the present disclosure.

In Step S201, while the optical input device 1 operates, the processing unit 15 operatively controls the image capturing unit 13 to capture a plurality of images according to a frame rate so as to sequentially generate a plurality of frames. It is worth to note that the processing unit 15 can process each of the image captured with a digital image contour removal (DCR) filter and generate the plurality of frames.

In Step S203, the processing unit 15 configures a first image captured as a reference frame 21 (e.g., an 18×18 image frame) In Step 205, the processing unit 15 configures an input image captured subsequent to the first image as a compare frame 23 (e.g., an 18×18 image frame). The pixelated data of compare frame 23 is stored in the memory unit 17 until the next consecutive input image is captured.

In Step S207, the processing unit 15 computes a first correlation between the reference frame IMG_REF and the compare frame IMG_CMP for a first correlation window 25 (e.g., a 5×5 correlation window). The processing unit 15 computes the first correlation by overlaying the compare frame 23 on the reference frame 21 such that the center 231 of the compare frame 23 is positioned on the center 211 of the reference frame 21. The processing unit 15 then has the reference frame 21 fixed in position while repeated shifting the compare frame 23 M pixels up/down (e.g., moving along a direction DE1) and N pixels left/right (e.g., moving along a direction DE2) and computing the correlations between the reference frame 21 and the compare frame 23 for the first correlation window 25, so as to obtain a first peak correlation value from the first correlation window 25 in Step S209. The first correlation window 25 herein is a 5×5 correlation window. However, as stated previously the first correlation window 25 can be configured based upon the operational requirement of the optical input device 1.

In Step 211, the processing unit 15 determines whether the first peak correlation value is located at the corner of the first correlation window 25. That is, the processing unit 15 determines whether the first peak correlation value is found in the corner region 251 of the first correlation window 25. When the processing unit 15 determines that the first peak correlation value is found in the corner region 251 of the first correlation window 25, the processing unit 15 executes Step S215. Conversely, when the processing unit 15 determines that the first peak correlation value is found in the non-corner region of the first correlation window 25, the processing unit 15 executes Step S213.

In Step S213, the processing unit 15 computes the displacement information based on the pixel position associated with the first peak correlation value identified in the compare frame 23. The processing unit 15 stores the displacement information in the memory unit 17. The processing unit 15 at the same time transmits the displacement information to the computing device using the communication unit 19.

In Step S215, after the processing unit 15 determines that the first peak correlation value is found in the corner region 251 (e.g., shaded region) of the first correlation window 25, the processing unit 15 operatively verifies whether the first peak correlation value is the peak correlation value between the reference frame 21 and the compare frame 23. The processing unit 15 computes another correlation between the reference frame 21 and the compare frame 23 for a second correlation window, wherein the second correlation window is defined as a predetermined region of the compare frame 23 centering on the pixel position associated with the first peak correlation value identified in the compare frame 23.

It worth to note that the corner region 251 of the first correlation window 25 includes the first row, the fifth row, the first column, and the fifth column of the first correlation window 25. In general, the corner region of a first correlation window is the outermost region of the first correlation window, wherein the outermost region includes the first row, the last row, the first column, and the last column of the first correlation window.

In Step S217, the processing unit 15 analyzes the second correlation window to obtain a second peak correlation value. In Step S219, the processing unit 15 compares the first peak correlation value with the second peak correlation value to determine whether the second peak correlation value is larger than the first peak correlation value.

When the processing unit 15 determines that the first peak correlation value is larger than the second peak correlation value, indicating that the first peak correlation value is the highest peak correlation value between the reference frame 21 and the compare frame 23, the processing unit 15 executes Step S213; otherwise, the processing unit 15 executes Step S221. In other words, when the processing unit 15 determines that the first peak correlation value computed is larger than the second peak correlation value, the processing unit 15 immediately recognizes that there is a feature (e.g., a light pattern) located at the pixel position associated with the first peak correlation value. Accordingly, the processing unit 15 computes the displacement information based on the pixel position associated with first peak correlation value identified in the compare frame 23.

In Step S221, the processing unit 15 determines that the second peak correlation value computed is larger than the first peak correlation value, indicating that the feature (e.g., a light pattern) is located at the pixel position associated with the first peak correlation value in the compare frame 23. Thus, the processing unit 15 computes the displacement information based on the pixel position associated with the second peak correlation value identified in the compare frame 23.

The processing unit 15 drives the communication unit 19 to transmit the displacement information calculated to a computing device for the use of controlling the operation of a cursor displayed on a display screen of the computing device.

In the instant embodiment, the tracking method described in FIG. 2 in the instant embodiment is executed by the processing unit 15 of the optical input device 1. In another embodiment, the correlation computation steps (i.e., Step S207~Step S221) of tracking method described in FIG. 2 can be executed by a computing device to reduce the computational load and power consumption of the optical input device 1. More specifically, the optical input device 1 can capture images reflective the work surface underneath to generate a plurality of frames, and transmit the frames to the computing device. The computing device can execute Step S207~Step S221 to compute correlation between the frames captured, verify the validity of the peak correlation value, and compute the displacement information.

Additionally, method depicted by FIG. 2 can be implemented by firmware design, i.e. writing corresponding firmware into the nonvolatile memory of the processing unit 15 and executed by the processing unit 15 when the optical input device 1 is in operation. In another embodiment, the tracking method disclosed in FIG. 2 can be stored as a series of program code in the memory unit 17, and executed by the processing unit 15 during the operation of the optical input device 1. Moreover, the frame rate may be pre-configured by the processing unit 15 according to the practical operation requirements of the optical input device 1.

Additionally, the present disclosure also discloses a non-transitory computer-readable media for storing the computer executable program code of the aforementioned tracking method associated with the optical input device 1. The non-transitory computer-readable media may be a floppy disk, a hard disk, a compact disk (CD), a flash drive, a magnetic tape, accessible online storage database or any type of storage media having similar functionality known to those skilled in the art.

In summary, the present disclosure provides a tracking method and an optical input device using the same for tracking the movement of the optical input device. When a peak correlation value computed is found at the corner of the predetermined correlation window in process of comparing frames captured, another correlation between the frames centering on the position of the peak correlation value is automatically computed to verify whether the peak correlation value is the actual peak or there is another peak exist outside the predetermined correlation window, so as to increase the accuracy of tracking the relative movement of the optical input device.

Moreover, the size of the correlation window used in correlating successive frames can be dynamically adjusted based on the frame rate of the optical input device as well as the current moving speed of the optical input device, such that the moving speed limit constraint placed on the optical input device can be removed.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A tracking method, adapted for tracking a movement of an optical input device, the tracking method comprising:
   a) capturing a first image as a reference frame and an input image subsequent to the first image as a compare frame while the optical input device operates;
   b) computing correlation between the compare frame and the reference frame for a first correlation window to obtain a first peak correlation value;
   c) computing another correlation between the compare frame and the reference frame for a second correlation window when the first peak correlation value obtained is located at a corner of the first correlation window to determine whether the first peak correlation value is the maximum correlation value between the compare frame and the reference frame, wherein the second correlation window is a predetermined region of the compare frame centering on the position of the first peak correlation value; and
   d) computing a displacement information of the optical input device based on the pixel position associated with a second peak correlation value identified in the compare frame when it is determined that the second peak correlation value of the second correlation window computed is larger than the first peak correlation value.

2. The tracking method according to claim 1, further comprising:
   e) computing the displacement information of the optical input device based on the pixel position associated with the first peak correlation value identified in the compare frame when determines that the second peak correlation value computed is smaller than the first peak correlation value.

3. The tracking method according to claim 1, wherein the step b) comprises:
   fixing the reference frame in position while repeatedly shifting the compare frame to compute correlations between pixel values of the reference frame and the respective pixel values of the compare frame within the first correlation window; and
   analyzing the first correlation window to identify the first peak correlation value.

4. The tracking method according to claim 1, wherein the step c) comprises:
   shifting the compare frame on the reference frame pixel by pixel to compute correlations between pixel values of the reference frame and the respective pixel values of the compare frame in the second correlation window;

analyzing the second correlation window to identify the second peak correlation value; and determining whether the second peak correlation value is greater than the first peak correlation value.

5. The tracking method according to claim 1, wherein the step after step c) comprises:

computing the displacement information of the optical input device based on the pixel position associated with the first peak correlation value identified in the compare frame when determines that the first peak correlation value is located at a non-corner position of the first correlation window.

6. The tracking method according to claim 1, wherein the sizes of the first correlation window and the second correlation window are predefined based on a frame rate of the optical input device.

7. The tracking method according to claim 6, wherein the frame rate of the optical input device is configured according to the moving speed of the optical input device.

8. The tracking method according to claim 1, wherein the minimum window size configured for the second correlation window is 3×3.

9. The tracking method according to claim 1, wherein the step after the step c) comprises:

repeating steps b) through c) after respectively updated the reference frame with the current compare frame and the compare frame with another input image until the optical input device stops operating.

10. The tracking method according to claim 1, further comprising:

storing the reference frame in a first memory bank of a memory unit in the optical input device and the compare frame in a second memory bank of the memory unit.

11. An optical input device, comprising:

a light source, operatively illuminating a work surface of the optical input device;

an image capturing unit, configuring for operatively capturing a plurality of images responsive to a reflected light of the work surface and generating a plurality of frames according to a frame rate; and a processing unit coupled to the light source and the image capturing unit, configured to analyze a movement of the optical input device based on the frames captured;

wherein the processing unit operatively executes a tracking method, the tracking method comprising:

a) controlling the image capturing unit to capture a first frame as a reference frame and an input frame subsequent to the first frame as a compare frame while the optical input device operates;

b) computing correlation between the compare frame and the reference frame for the first correlation window to obtain a first peak correlation value;

c) computing correlation between the compare frame and the reference frame for a second correlation window when the first peak correlation value is located at a corner of the first correlation window so as to determine whether the first peak correlation value is the maximum correlation value between the compare frame and the reference frame, wherein the second correlation window is a predetermined region of the compare frame centering on the position of the peak correlation value; and d) computing a displacement information of the optical input device based on the pixel position associated with a second peak correlation value identified in the compare frame when it is determined that the second peak correlation value of the second correlation window is larger than the first peak correlation value.

12. The optical input device according to claim 11, wherein the tracking method further comprises:

e) computing the displacement information of the optical input device based on the pixel position associated with the first peak correlation value identified in the compare frame when determines that the first peak correlation value is larger than the second peak correlation value.

13. The optical input device according to claim 12, wherein the processing unit updates the reference frame with the current compare frame and the compare frame with another input frame after computing the displacement information, and repeating steps b) through e) until the optical input device stops operating.

14. The optical input device according to claim 11, wherein the step after step b) comprises:

computing the displacement information of the optical input device based on the pixel position associated with the first peak correlation value identified in the compare frame when determined that the first peak correlation value is located at a non-corner position of the first correlation window.

15. The optical input device according to claim 11, further comprising:

a memory unit coupled to the processing unit, configured for storing the reference frame, the compare frame, the first peak correlation value, the second peak correlation value, and the displacement information.

16. The optical input device according to claim 11, wherein the processing unit determines the sizes of the first correlation window and the second correlation window based on the frame rate.

17. The optical input device according to claim 11, wherein the processing unit configures the frame rate of the optical input device according to the moving speed of the optical input device.

18. The optical input device according to claim 11, wherein the minimum window size of the second correlation window is 3×3.

19. The optical input device according to claim 11, wherein the optical input device is an optical mouse and the optical input device operatively transmits the displacement information to the display apparatus to control the movement of a cursor on a display apparatus.

* * * * *